United States Patent
Schindler et al.

(10) Patent No.: US 7,582,984 B2
(45) Date of Patent: Sep. 1, 2009

(54) ELECTRONIC STEERING LOCK

(75) Inventors: Mirko Schindler, Velbert (DE);
Andreas Van Den Boom, Essen (DE);
Helmut Schumacher, Coesfeld (DE);
Franz-Josef Weber, Erkrath (DE);
Rainer Vaupel, Hattingen (DE)

(73) Assignee: Huf Hülsbeck & Fürst GmbH & C. KG, Velbert (DE)

( * ) Notice: Subject to any disclaimer, the term of this patent is extended or adjusted under 35 U.S.C. 154(b) by 244 days.

(21) Appl. No.: 11/661,046

(22) PCT Filed: Jul. 1, 2005

(86) PCT No.: PCT/EP2005/007116
§ 371 (c)(1),
(2), (4) Date: Feb. 22, 2007

(87) PCT Pub. No.: WO2006/024336
PCT Pub. Date: Mar. 9, 2006

(65) Prior Publication Data
US 2007/0251280 A1  Nov. 1, 2007

(30) Foreign Application Priority Data
Aug. 27, 2004  (DE) .................. 10 2004 041 869

(51) Int. Cl.
*B60R 25/04* (2006.01)
*E05B 17/00* (2006.01)
*H01H 27/00* (2006.01)
(52) U.S. Cl. .................................... 307/10.3
(58) Field of Classification Search ................. 307/10.3
See application file for complete search history.

(56) References Cited

U.S. PATENT DOCUMENTS

| | | | |
|---|---|---|---|
| 6,784,631 B2 * | 8/2004 | Kollmann | 318/280 |
| 6,914,347 B2 | 7/2005 | Geber et al. | |
| 7,161,262 B2 | 1/2007 | Nagae et al. | |
| 7,250,693 B2 * | 7/2007 | Hayashi et al. | 307/10.2 |
| 2004/0046453 A1 | 3/2004 | Hayashi et al. | |

FOREIGN PATENT DOCUMENTS

| | | |
|---|---|---|
| DE | 199 45 867 | 4/2001 |
| DE | 100 10 450 | 9/2001 |
| DE | 100 12 440 | 9/2001 |
| DE | 100 39 090 | 2/2002 |
| DE | 103 14 575 | 11/2003 |
| EP | 1 359 070 | 11/2003 |
| EP | 0 909 685 | 10/2004 |

* cited by examiner

*Primary Examiner*—Albert W Paladini
*Assistant Examiner*—Hal I Kaplan
(74) *Attorney, Agent, or Firm*—Fay Sharpe LLP

(57) ABSTRACT

An electronic steering lock includes a power supply control unit and a locking assembly. The power supply control unit provides a supply voltage for locking the assembly via a ground supply line and a voltage supply line. The locking assembly is only supplied with a supply voltage and ground when a voltage with respect to ground is present on an ignition supply line, which is indicative of the ignition being switched off. The locking assembly includes a locking motor supplied with voltage and ground, whereby the ground supply of the locking motor is provided via a ground supply switching device. The locking assembly further includes a control circuit which controls the ground supply switching device. The control circuit produces a control signal which opens the ground supply switching device when the voltage on the additional input connection is indicative of the ignition being switched on.

11 Claims, 1 Drawing Sheet

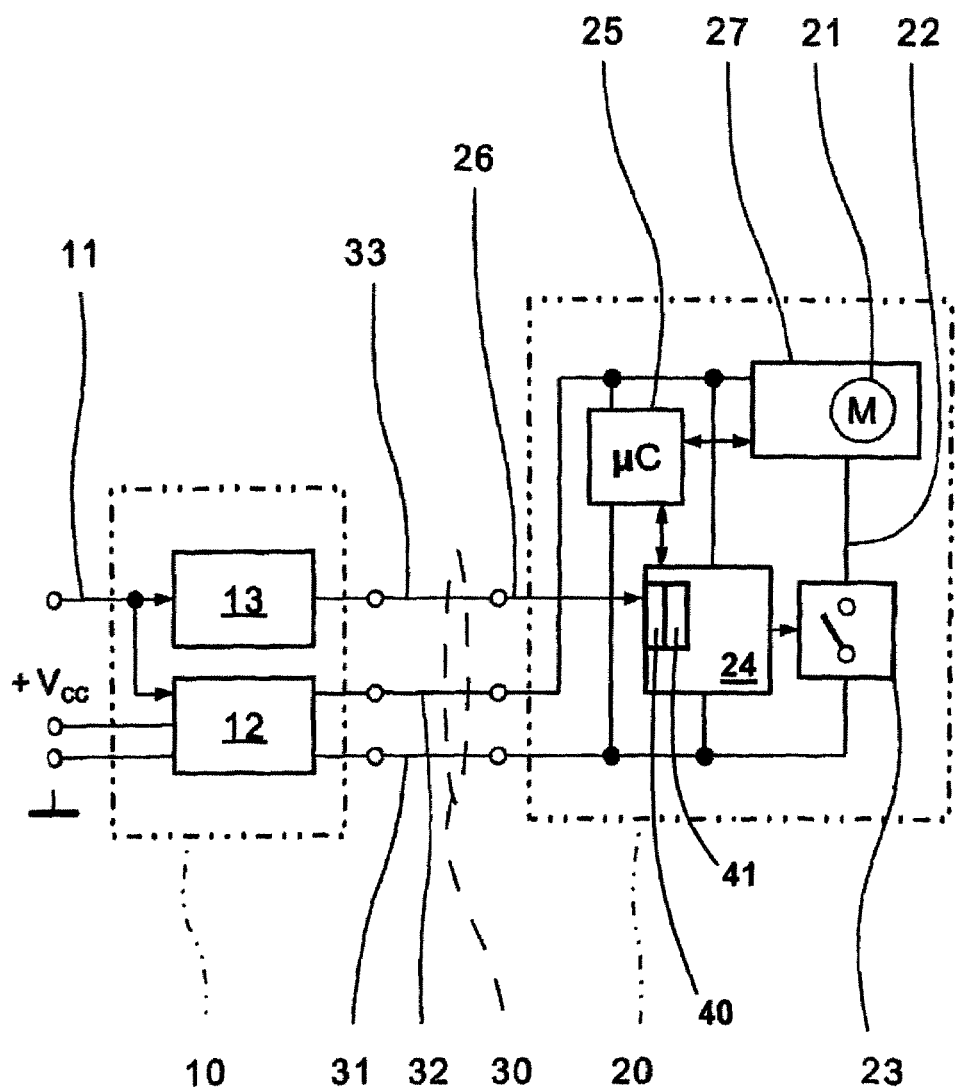

ELECTRONIC STEERING LOCK

The invention relates to an electronic steering lock with a power supply control unit and a locking assembly, the power supply control unit providing the supply voltage for the locking assembly via a ground supply line and a voltage supply line, the locking assembly being supplied by the power supply control unit with the supply voltage and ground only when a voltage relative to ground acts on an ignition supply line (terminal 15), which indicates that the ignition is switched off, the locking assembly including a locking motor and supplying it with the supply voltage and ground.

The power supply control unit is so constructed that it switches the locking assembly out of the circuit (i.e. it is supplied with neither the supply voltage nor with ground), when the ignition lock and the ignition are switched on. This is generally the case whilst driving. A circuit for switching a steering lock out of the circuit, as can find application, for instance, in the power supply control unit, is disclosed in the patent specification DE 199 62 180 C1. The known circuit arrangement includes two parallel operating controllers, which control not only a control circuit for supplying a steering lock with ground but also a control circuit for supplying the steering lock with the supply voltage. The controllers receive signals constituting input signals from switches on the ignition starting lock. Furthermore, one input of the controller is coupled to the so-called terminal 15, i.e. the ignition supply line. The controllers are so programmed that not only the supply voltage but also ground are only made available to the steering lock when, as one of the conditions, the ignition (terminal 15) is switched off (is at ground) and the ignition lock is switched off.

Starting from this state of the art, it is the object of the invention to increase the reliability of switching the locking motor of the steering lock out of the circuit and, in particular, to reduce the probability that, as a result of multiple defects and failures, ground is inadvertently applied to the locking motor.

This object is solved in accordance with the invention by an electronic steering lock with the features of claim 1.

The electronic steering lock includes a power supply control unit and a locking assembly. The power supply control unit provides the supply voltage for the locking assembly via a ground supply line and a voltage supply line. It is noted in this connection that the supply line (both ground and voltage supply) can also include a plurality of parallel and uniformly controlled lines. The locking assembly is then supplied with the supply voltage and ground by the power supply control unit only when a voltage with respect to ground is present on an ignition supply line (terminal 15) which indicates that the ignition is switched off (i.e. usually 0 volts). A voltage which is not equal to zero with respect to ground can of course also be present which nevertheless indicates that the ignition is switched off, particularly a slight potential difference with respect to ground as a result of parasitic influences. The locking assembly includes a locking motor and supplies the latter with the supply voltage and ground. The locking motor can be both a translational actuator and also a motor including a rotor. The motor is coupled to some sort of transmission mechanism which, when appropriately controlled by the motor, ensures that the steering is locked or unlocked (for instance by mechanical engagement in the steering column). This lock is so constructed that it remains in the unlocked or locked state when the motor is not actuated. The locking assembly commonly provides the locking motor with the supply voltage and the ground via interposed switching devices, which are controlled by associated control devices (and, for instance, a microcontroller). In the electronic steering lock in accordance with the invention, the ground supply to the locking motor is provided via a ground supply switching device, the locking assembly including a control circuit, which controls the ground supply switching device. In accordance with the invention, the control circuit includes an additional input connection, to which a control signal derived from the ignition supply line(terminal 15) is applied. If the voltage at the additional input connection (i.e. the derived control signal) indicates that the ignition is switched on, the control circuit produces a control signal which opens the ground supply switching device. In the case where the ground from the power supply control unit should be provided to the locking assembly, this ground supply is not conducted on to the locking motor. The additional control circuit, which receives the derived control signal, provides additional security when switching off the voltage/ground supply of the steering lock. The additional application of a control signal derived from the ignition supply line to the locking assembly enables a simpler construction of the power supply control unit as a result of the additional security which is thus created. For instance, embodiments are possible in which, instead of two redundant controllers in the power supply control unit (as were used, for instance, in the known arrangement referred to above), only one controller is used which reduces the cost of the overall assembly.

In a preferred embodiment of the steering lock in accordance with the invention, the control signal derived from the ignition supply line is at a lower voltage level, for instance at ground, when the ignition supply line is at a high voltage level, for instance at 12 volts. The control circuit thus produces the control signal which opens the ground supply switching device when the additional input connection is at a low voltage. This embodiment uses an inverting circuit to derive the derived control signal from the ignition supply line. The embodiment has the advantage that when the line coupled to the additional input connection, which normally conducts the derived control signal, is inadvertently at ground potential, the ground supply to the locking motor is interrupted. In a preferred development of this embodiment, the control circuit produces the control signal which opens the ground supply switching device when the additional input connection is unconnected or open. This means that the input connection of the control circuit is so constructed that tearing away of the line conducting the derived control signal also results in control such that the ground supply of the locking motor is interrupted. The control signal which opens the ground supply switching device is thus only produced in the last mentioned embodiment when the additional input connection is at a high voltage level, for instance at 12 volts.

In a further development of the last mentioned embodiment, it is provided that the derived control signal is so produced that it is not at the maximum voltage level (for instance 12 volts) but at a value (for instance 6 volts) lying between this maximum voltage level and ground when the ignition is switched off, i.e. terminal 15 is at ground potential. In this event, the input circuit, connected to the additional input connection, of the control circuit could be so constructed that it does not produce the control signal which opens the ground supply switching device only when the voltage (for instance 6 volts), which indicates that the ignition is switched off, is present at the additional input connection. Inadvertent short-circuiting of this input connection to the maximum voltage (i.e., for instance, up to 12 volts) could thus not result in inadvertent production of the ground supply connection.

In one embodiment of the invention, current-limiting means are coupled to the control signal and limit a control signal current, in the event of a defect, to a predetermined value. As a result of this feature, additional security of the steering lock is achieved. The limited current is not sufficient to permit starting of the locking motor. Corresponding means can also be incorporated e.g. as a circuit at any desired position in the control signal pathway. The current-limiting switching circuit can be disposed e.g. in or directly behind the power supply control unit or directly in front of the locking assembly (e.g. at an input terminal).

The current-limiting circuit is preferably integrated in the control circuit.

Further advantageous and/or preferred embodiments of the invention are characterised in the dependent claims.

The invention will be described below in more detail with reference to a preferred exemplary embodiment illustrated in the drawing, in which:

FIG. 1 is a schematic block circuit diagram of an electronic steering lock in accordance with the invention.

An electronic steering lock includes mechanical components, which are actuated by a locking motor, and electrical and electronic components, which control the locking motor in the desired manner. The present invention relates primarily to the electrical and electronic components so that a detailed description of the mechanical components will be omitted. The mechanical components can be constructed in a conventional manner and can, for instance, act in a steering column. The electrical and electronic components include a power supply control unit and the circuits of the actual locking assembly. The locking assembly generally constitutes, together with the mechanical components, a structural unit, which is commonly referred to as an "electronic steering lock" (ESL) in a narrower sense.

FIG. 1 is a diagrammatic view of the units important to the invention. A power supply control unit 10 is connected via a number of lines, which can be combined together in a wiring harness 30, to the locking assembly 20. The power supply control unit 10 supplies the supply voltage for all the components included in the locking assembly 20 via a ground line 31 and a voltage supply line 32. If the steering lock is not to be actuated in any manner under certain operating conditions (for instance whilst driving), the power supply control unit 10 ensures that neither ground nor the supply voltage are supplied to the locking assembly 20 via the line 31 and line 32, respectively. In order to ensure that a ground or a supply voltage can not get to the locking assembly 20 via any other route, the supply lines from the power supply control unit 10 constitute the only supply lines which lead to the locking assembly 20. The supply to the ground line 31 and the voltage supply line 32 are controlled by the unit 12, which receives ground and the operating voltage (generally 12 volts). The control unit 12 generally includes an electronic control device (controller), which effects the control of the ground line 31 and the voltage supply line 32 in dependence on different control signals. The control signals can, for instance, include signals from the ignition-start lock and the so-called "terminal 15" (ignition supply line) 11.

The power supply control unit 10 developed in accordance with the invention also includes a circuit 13, which receives the ignition supply line 11 (terminal 15) and derives a control signal therefrom, which is output onto the line 33. The derived control signal output onto the line 33 is preferably characterised in that, when the ignition supply line is at ground (ignition switched off) it conducts a high control voltage (for instance 12 volts) and, when the ignition supply line 11 is at a high voltage (particularly 12 volts), it conducts a low voltage (preferably 0 volts). The derived control signal thus logically constitutes the inverted signal from the terminal 15. It is provided in one embodiment that the derived control signal is at a mean level (for instance 6 volts) when the terminal 15 indicates a switched-off state of the ignition (is at ground).

The locking assembly 20 includes firstly two input terminals, at which it receives the ground and the supply voltage from the power supply control unit 10. The locking assembly 20 also includes a motor assembly 27, which includes an actuator 21. Both the ground and also the supply voltage, which have been received from the power supply control unit 10, are conducted on to the motor assembly 27 within the locking assembly 20. This conducting on process is effected via switching devices, by which the supply of the motor 21 with ground and the supply voltage can be interrupted, if movement of the motor is to be prevented. In the schematic view of FIG. 1, the voltage supply line is shown leading directly from the input connection of the locking assembly 20 to the motor assembly 27 whilst the ground is conducted from the input connection on line 31 via a switch 23 to the motor assembly 27. In alternative embodiments, further switching devices can of course be coupled in between the ground/supply voltage input connectors. In the context of the invention, however, only the ground supply switching device 23 is relevant which, in the closed condition, conducts a ground potential via line 22 to the motor assembly 27 and thus to the locking motor 21.

The locking assembly 20 includes a microcontroller, which produces the control signals for the desired control of the motor assembly 27. The locking assembly 20 also includes a control circuit 24, which produces a control signal for the switching device 23. The control circuit 24 is coupled via a number of lines to the microcontroller 25 in order to receive control signals from it and to output signals to the microcontroller which are indicative of predetermined conditions of the control circuit 24. The microcontroller 25 receives control signals (not shown in FIG. 1), which indicate desired locking and unlocking operations. These control signals, which are also referred to as data signals, are preferably encrypted so that unlocking/locking operations are only initiated with the correct coding of the data signals. Furthermore, the microcontroller can also produce output signals and produce outputs from the locking assembly 20, which are indicative of predetermined locked conditions. The cooperation of the microcontroller 25 and motor assembly 27 whilst unlocking or locking the steering lock need not be described here in more detail since these details are not important for an understanding of the present invention.

In accordance with the invention, the control circuit 24 includes an additional input connection 26, to which the control signal, which is applied to line 33 and is derived from the ignition supply line 11 within the power supply control unit 10, is applied. The input connection 26 is thus an additional connection as it is added to the usual input connections of the control circuit 24, which are connected to the microcontroller 25. The control circuit 24 is thus so constructed that it produces a control signal which opens the switch device 23 when the voltage at the additional input connection 26 is not at the high voltage indicating that the ignition is switched off. The control circuit 24 then produces, in particular, a control signal which opens the switching device 23 either when ground potential is applied to the input connection 26 via line 33 (which indicates that the ignition is switched on) or when the input connection 26 is inadvertently short-circuited to ground or has no power applied (for instance the line 23 has been torn away). In one embodiment of the control circuit 24, this is achieved with a transistor input stage, in which the base of a switching transistor is so coupled to the input connection 26 that the transistor switches on when the input connection 26 is at the desired high potential and receives a sufficiently high input current. The transistor input stage of the control circuit 24 then produces, for instance by means of a further transistor stage, a control signal, which is coupled, for instance, to a gate of a switching field effect transistor in the switching device 23.

A large number of embodiments of the control circuit 24 are possible which are able to produce a control signal for a gate of a switching transistor in the switching circuit 23 in dependence on not only output signals of the microcontroller 25 but also the derived control signal. In the preferred embodiment, the control circuit 24 is so constructed that it only produces that control signal, which closes the switching device 23 and thus produces the ground supply for the assembly 27, when there is a predetermined high voltage on the input connection 26 and the correct control signals from the microcontroller 25 and furthermore only when the transistor components of the control circuit are intact. In addition, the input circuit of the control circuit 24 can include an overvoltage protector 41 and an input current limiting circuit 40.

The invention claimed is:

1. An electronic steering lock including a power supply control unit and a locking assembly,
wherein the power supply control unit provides the supply voltage for the locking assembly via a ground supply line and a voltage supply line, the locking assembly only being supplied by the power supply control unit with the supply voltage and ground when a voltage with respect to ground is present on an ignition supply line (terminal 15), which is indicative of the ignition being switched off,
wherein the locking assembly includes a locking motor and supplies the latter with the supply voltage and ground, whereby the ground supply of the locking motor is provided via a ground supply switching device,
the locking assembly further including a control circuit, which controls the ground supply switching device, wherein the control circuit includes an additional input connection, on which there is a first control signal derived from the ignition supply line, the control circuit producing a second control signal which opens the ground supply switching device when the voltage on the additional input connection is indicative of the ignition being switched on.

2. An electronic steering lock as claimed in claim 1, characterized in that the first control signal derived from the ignition supply line is at a low voltage level, preferably at ground, when the ignition supply line is at a high voltage level, and that the control circuit produces the second control signal which opens the ground supply switching device when the additional input connection is at a low voltage.

3. An electronic steering lock as claimed in claim 2, characterized in that the second control circuit also produces the control signal which opens the ground supply switching device when the additional input connection is unconnected or open.

4. An electronic steering lock as claimed in claim 3, characterized in that the first control signal derived from the ignition supply line is at a predetermined level, which lies between ground and the maximum voltage, when the ignition supply line is at ground and that the control circuit does not produce the second control signal which opens the ground supply switching device only when the additional input connection is at the predetermined level.

5. An electronic steering lock as claimed in claim 1, characterized in that the first control signal derived from the ignition supply line is produced in the power supply control unit and the ground supply line, the supply voltage line and a line conducting the derived control signal extend in a wiring harness from the power supply control unit to the locking assembly.

6. An electronic steering lock as claimed in claim 3, characterized in that the control circuit outputs at least one signal to a controller of the locking assembly, which signal is derived from the control signal at the additional input connection and is indicative of its state.

7. An electronic steering lock as claimed in claim 6, characterized in that the control circuit includes a protection circuit against overvoltages on the additional input connection.

8. An electronic steering lock as claimed in claim 6, characterized in that current-limiting means are coupled to the control signal, which limit a control signal current to a predetermined current value in the event of a defect.

9. An electronic steering lock as claimed in claim 8, characterized in that the current-limiting means are integrated in the control circuit.

10. An electronic steering lock as claimed in claim 1, characterized in that the ground supply switching device includes a switching transistor, which is blocked when a control signal is applied.

11. An electronic steering lock as claimed in claim 10, characterized in that the switching transistor includes a gate which receives the control signal, whereby the control signal coupled to the gate of the switching transistor is present when the control signal on the additional input connection is at ground potential.

* * * * *